United States Patent [19]

Takeuchi

[11] Patent Number: 5,673,868
[45] Date of Patent: Oct. 7, 1997

[54] SPINNING REEL FOR FISHING WITH A ROTOR PARTIALLY REDUCED IN WALL THICKNESS.

[75] Inventor: Shinji Takeuchi, Tokyo, Japan

[73] Assignee: Daiwa Seiko, Inc., Tokyo, Japan

[21] Appl. No.: 581,195

[22] Filed: Dec. 29, 1995

[30]      Foreign Application Priority Data

Dec. 29, 1994   [JP]   Japan ................................. 6-339239

[51] Int. Cl.$^6$ ................................................. A01K 89/01
[52] U.S. Cl. ................................................. 242/231
[58] Field of Search ................................. 242/230, 231, 242/232, 233

[56]           References Cited

U.S. PATENT DOCUMENTS

| 5,379,957 | 1/1995 | Furomoto et al. | 242/230 |
| 5,503,342 | 4/1996 | Furomoto | 242/231 |

FOREIGN PATENT DOCUMENTS

| 0 585 947 A1 | 3/1994 | European Pat. Off. | 242/230 |
| 6-197670 | 7/1994 | Japan | A01K 89/01 |
| 3002014 | 7/1994 | Japan | A01K 89/01 |

*Primary Examiner*—Katherine Matecki
*Attorney, Agent, or Firm*—Sughrue, Mion, Zinn, Macpeak & Seas, PLLC

[57]            ABSTRACT

In a spinning reel, the rear portion of the inner periphery of a large-diameter cylindrical portion and base portion of the rotor on the β side of the rotor are formed into a thin-walled portion with a recess as compared with the rear area α of the rotor. The rear area α is closer to the bail support arm having a fishline guide portion than to the other bail support arm and is within the fishline winding side of the semi-annular bail arm. Furthermore the bail support arms and the bail support members are offset by a distance D with respect to the center of the rotary shaft of the rotor. This arrangement improves not only fishing operability, by stabilizing the rotational balance of the rotor without increasing the weight of the reel body as a whole but also improves fabrication efficiency by reducing the number of parts needed, since a discrete balance is no longer needed.

10 Claims, 7 Drawing Sheets

PRIOR ART

PRIOR ART

PRIOR ART

SPINNING REEL FOR FISHING WITH A ROTOR PARTIALLY REDUCED IN WALL THICKNESS.

BACKGROUND OF THE INVENTION

The present invention relates to a spinning reel for fishing designed to stabilize the rotational balance of a rotor.

A typical conventional spinning reel for fishing is constructed such that a pair of bail support arms are respectively formed from the rear to front part of the cylindrical portion of and on both sides of a rotor, a semi-annular bail arm is fitted to the leading end portions of the pair of bail support arms via bail support members such as a bail holder and an arm lever having a fishline guide portion. The semi-annular bail arm is reversible between a fishline winding position and a fishline playing-out position.

Such spinning reel suffers from a problem in that the axial and rotational balance of the rotor is, adversely affected by the weight imbalance causes by both the shape and location of the semi-annular bail arms and the bail support members. For instance these bail arms and bail support members may project forward or may not be formed bilaterally symmetrically.

Japanese Utility Model No. 3002014 and Japanese Patent Laid-Open Publication No. 197670 disclose balancing, as shown in FIGS. 10 to 13, which attempt to solve such inferior rotational balance.

Figure 10:
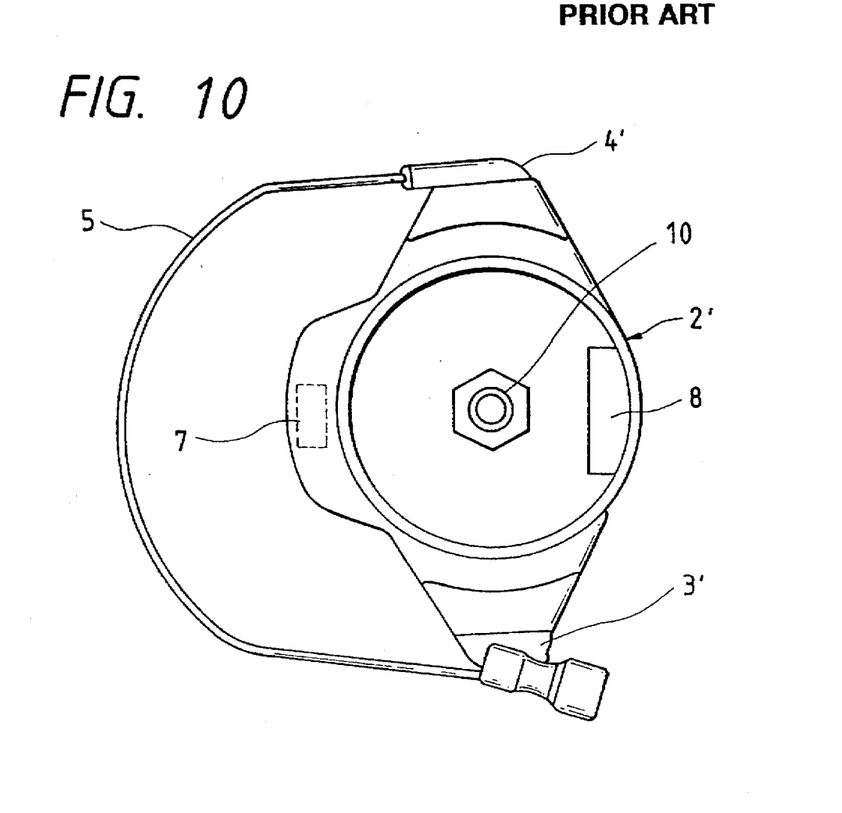
FIG. 10 is a plan view of a conventional bail support arm, bail support member and rotor on one side.
Figure 11:
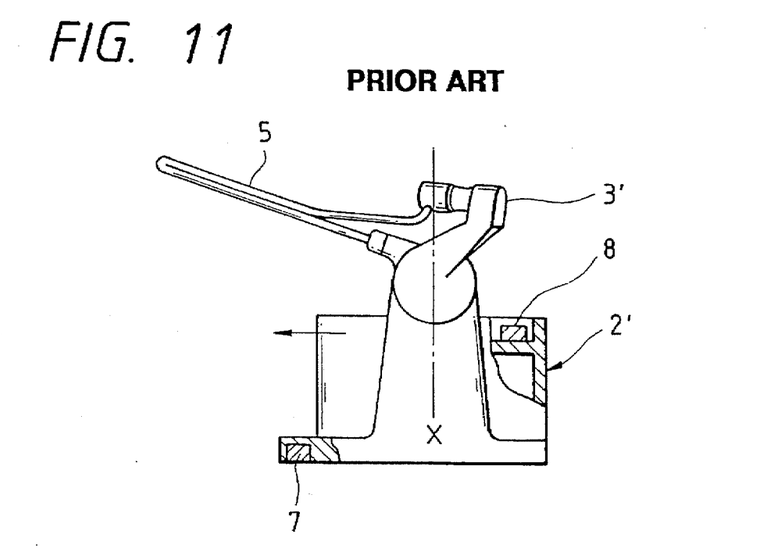
FIG. 11 is an elevational view of the conventional rotor of FIG. 10.

As shown in FIGS. 10 and 11, a balancer 7 for keeping longitudinal balance in the axial direction is provided in the rear end portion (when the bail is positioned for fishline rotor 2' on the bail side of a winding). Additional a balancer 8 is provided on the bail playing-out side higher up on the rotational axes than the balancer 7. This stabilizes the rotational the rotational balance of the rotor by correcting the imbalance in weight as viewed from a direction perpendicular to the rotary shaft 10 of the rotor and reducing vibrations during the rotational operation.

Figure 12:
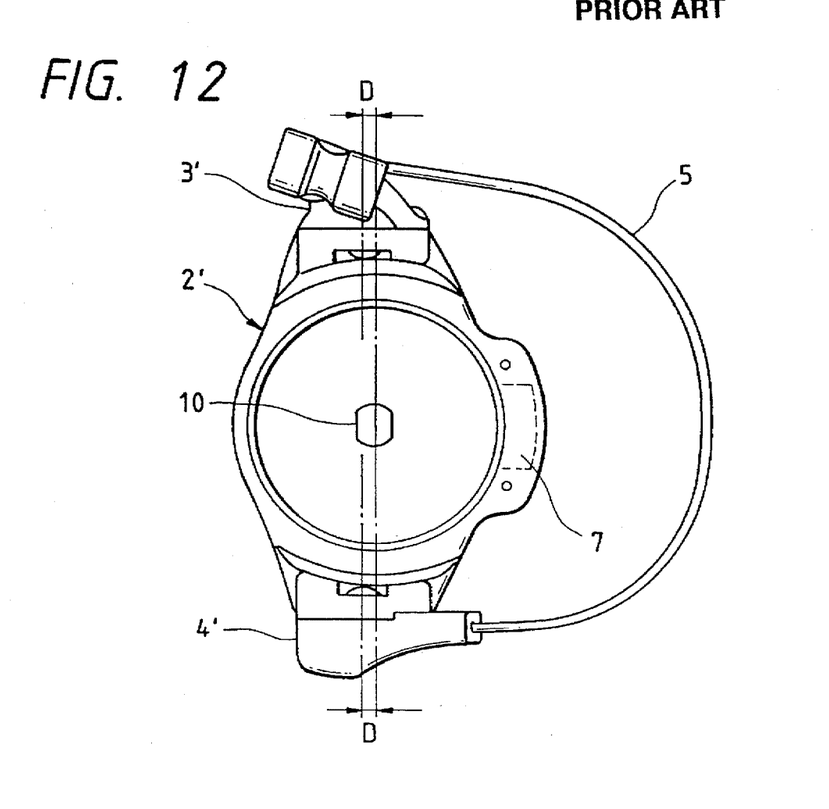
FIG. 12 is a top view of another the conventional bail support arm, bail support member and rotor.
Figure 13:
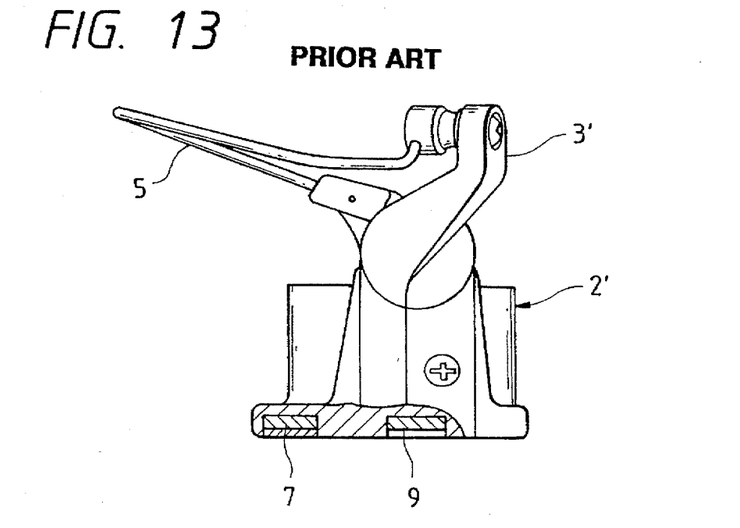
FIG. 13 is an elevational view of the conventional rotor of FIG. 12.

In FIGS. 12 and 13, balancers 7, 9 for keeping longitudinal balance in the axial direction are provided in the rear end portion, in the fishline rotor 2' on the bail side of a winding position. The rotor 2' is installed in such a way that it is offset by a dimension D with respect to its rotary shaft 10. As a result, the rotational balance of the rotor is stabilized by correcting the imbalance in weight as viewed from a direction perpendicular to the rotary shaft 10 and reducing vibrations during the rotational operation.

Notwithstanding, the rotor, and thus also as a whole, the reel, becomes heavier because the bail side in the rear end portion of the rotor projects outward, and because the balancer is composed of a material having high specific gravity such as lead, is rigidly and separately secured thereto. Consequently, the fishing operability is lowered, and the provision of the separate balancer results in increasing the number of parts, thus lowering fabrication efficiency.

Moreover, another problem arises from the a balancer that projects in that the configuration of the rear end portion of the rotor is restricted.

Accordingly, the drawback encountered in the prior art include the lowered fishing operability as the reel as a whole becomes heavier due to the provision of the balancer as a separate body, the associated increase in the number of parts, and the resulting lowered fabrication efficiency.

SUMMARY OF THE INVENTION

In view of the foregoing shortcomings, an object of the present invention is to provide a spinning reel for fishing designed to stabilize the rotational balance of a rotor. Further objects are improving the fishing operability without increasing the weight of the reel as a whole or the number of manufacturing parts. Yet another object is increasing fabrication efficiency by dispensing with a balancer as a separate body.

A spinning reel for fishing according to the present invention comprises: a pair of bail support arms formed on a rotor rotatable in accordance with rotation of a handle; and bail support members, one of which has a fishline guide portion, being supported on the leading end portions of the bail support arms. The bail support members are reversible between a fishline winding position and a fishline playing-out position, wherein the pair of bail support arms are deflected or offset from the center of the rotary shaft of the rotor to the fishline playing-out side of the bail. The the rear portion of the rotor on the side facing, across the rotary shaft of the rotor, the rear area of the rotor on the side of the bail support arm having the fishline guide portion and on the side of the bail when set in the fishline winding position is thin-walled.

As the rotor (2) rotates, the weight of the pair of bail support arms (2f, 2g) becomes applied eccentrically since the semi-annular bail arm (5) and the fishline guide portion (A) are made heavier, but the rotational balance of the rotor (2) is kept intact broken by offsetting the pair of bail support arms from the center of the rotary shaft of the rotor to the fishline playing-out side of the bail and by forming the rear portion of the rotor (2) such that a part of the rear portion on the side ($\beta$) is made thin as a thin-walled portion (2k, 2p, 2r, 2s) as compared in configuration with the rear area ($\alpha$) of the rotor facing the side ($\beta$) across the rotary shaft (10). With the weight imbalance thus corrected, the rotational balance of the rotor 2 is stabilized.

DETAILED DESCRIPTION OF THE PREFERRED EMBODIMENTS

Figure 1:
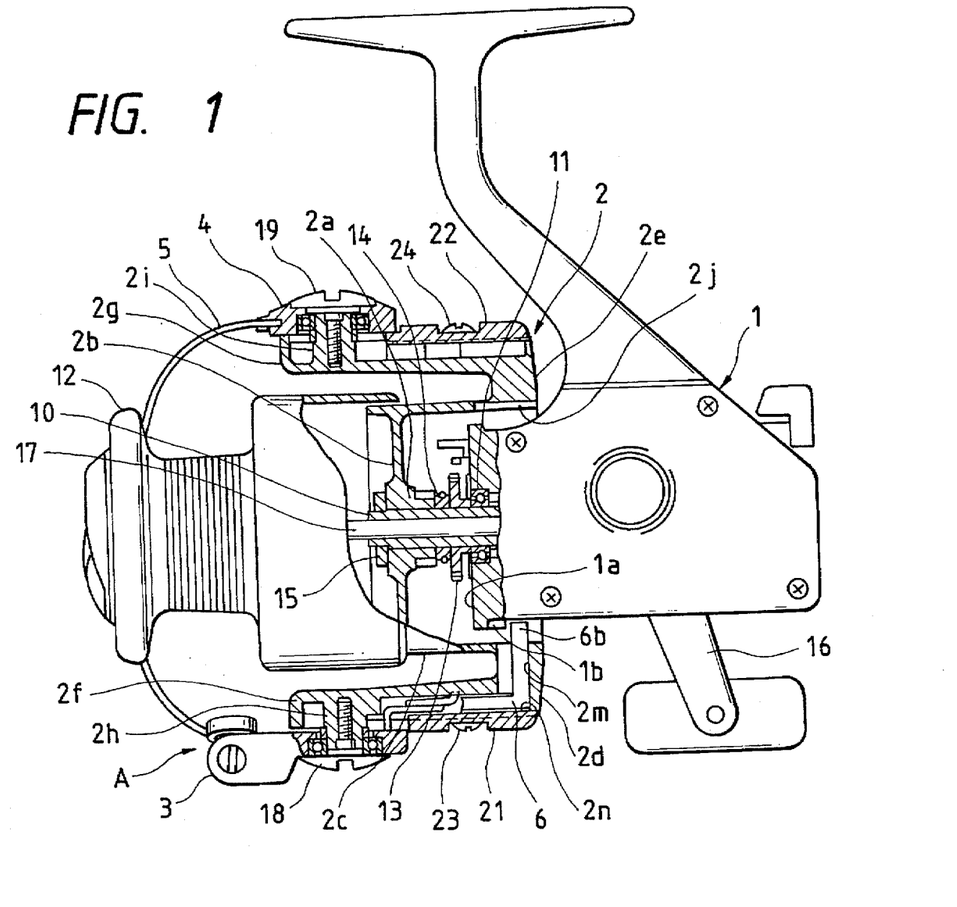
FIG. 1 is a sectional side view of the principal part of a spinning reel for fishing as a first embodiment of the present invention.
Figure 2:
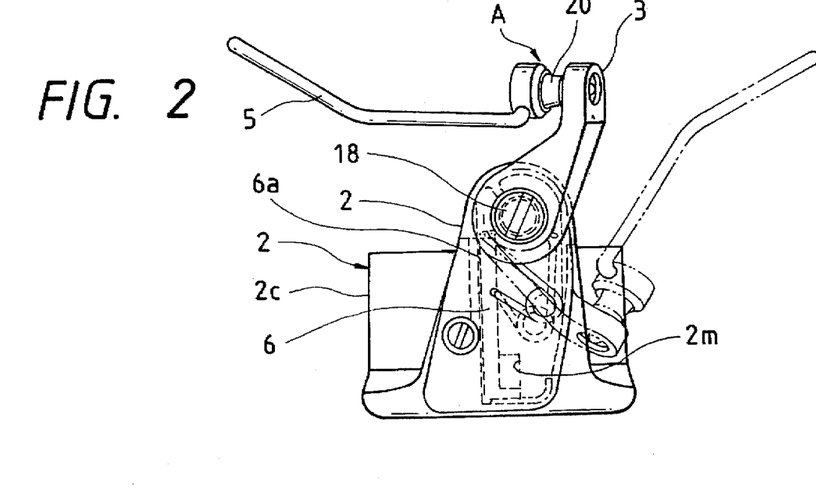
FIG. 2 is a plan view of the bail support bail support member and rotor on one side according to the present invention.
Figure 3:
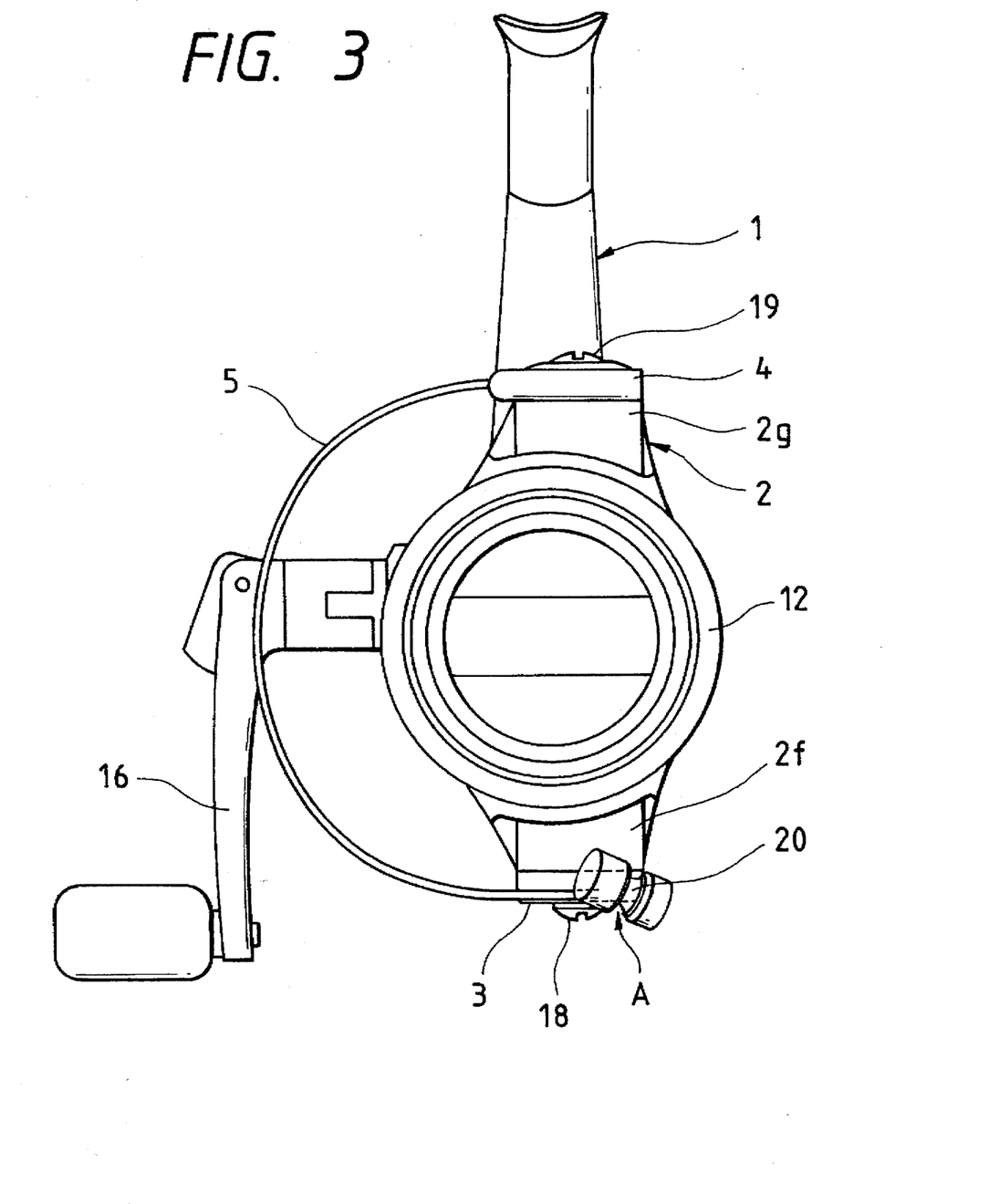
FIG. 3 is an elevational view of the spinning reel for fishing according to the present invention.
Figure 4:
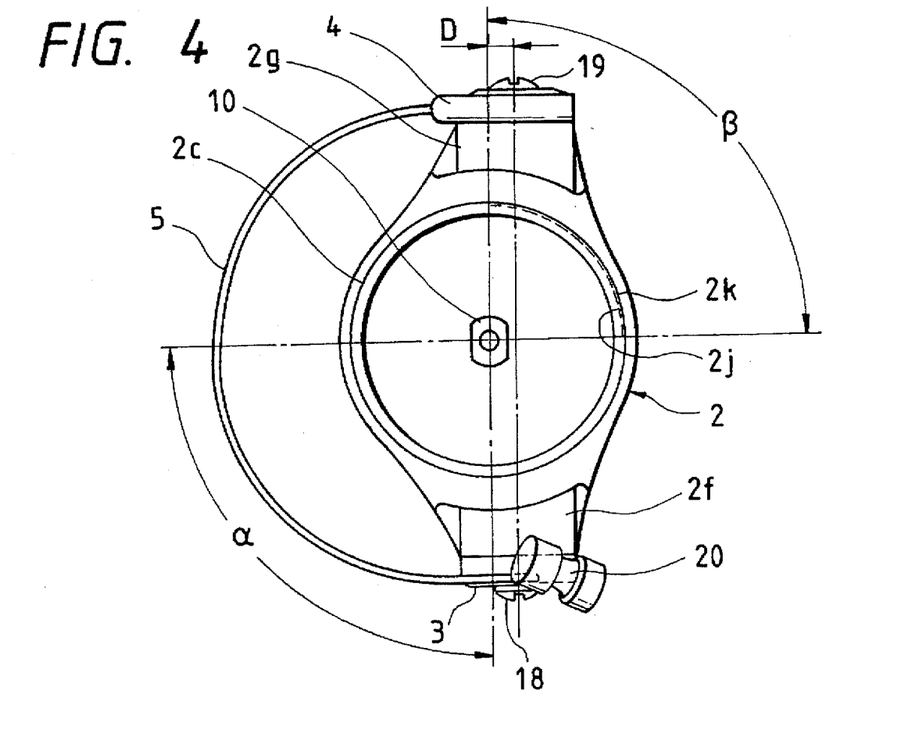
FIG. 4 is an elevational view of the bail support arm, bail support member and rotor according to the present invention.
Figure 5:
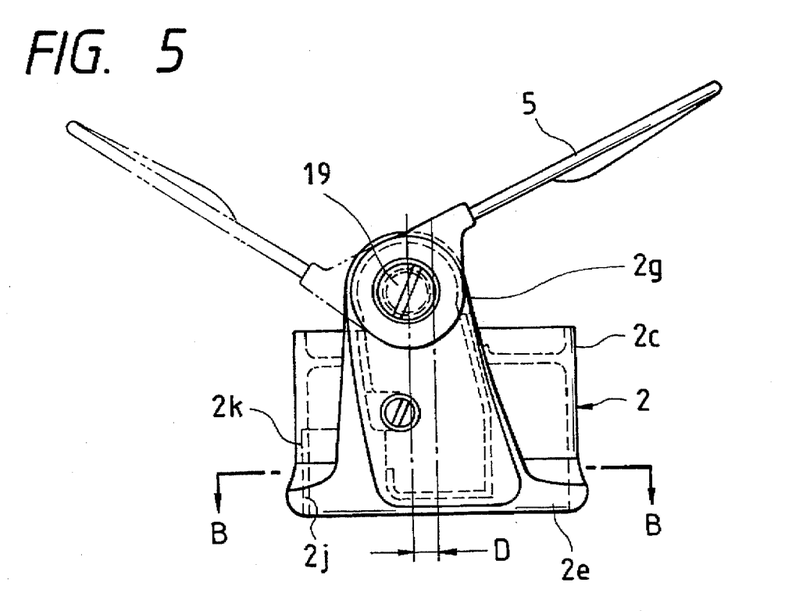
FIG. 5 is a plan view of the bail support bail support member and rotor on the other side according to the present invention.
Figure 6:
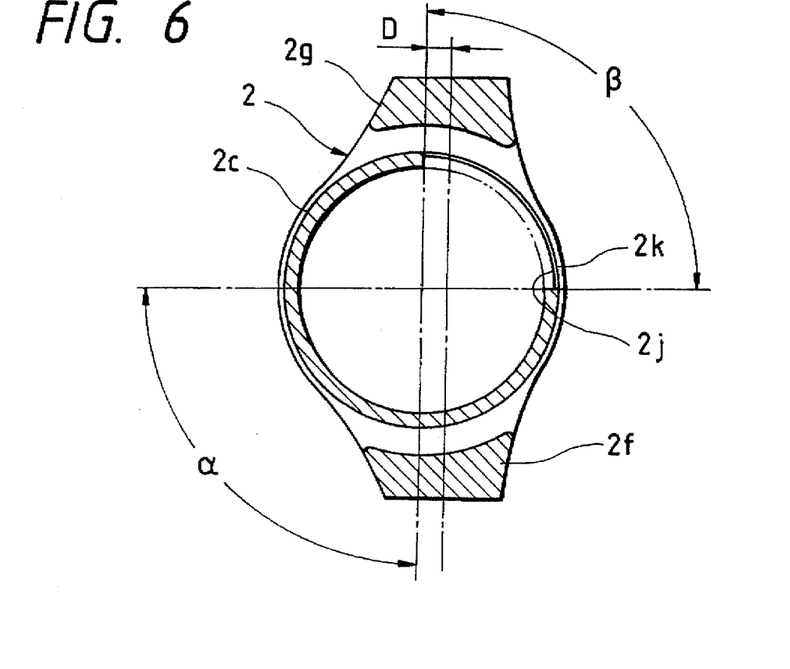
FIG. 6 is a sectional elevational view of the rotor taken on line B—B of FIG. 5.

A description will subsequently be given of an embodiment of the present invention by reference to the accompanying drawings. FIGS. 1 to 6 inclusive, illustrate a first embodiment: FIG. 1 is a sectional side view of the principal part of a spinning reel for fishing; FIG. 2 a plan view of a bail support arm on one side, a bail support member and a rotor; FIG. 3 an elevational view of the spinning reel for fishing; FIG. 4 an elevational view of the bail support arm, the support member and the rotor; FIG. 5 a plan view of the bail support arm on the other side, the bail support member and the rotor; and FIG. 6 a sectional elevational view of the rotor taken on line B—B of FIG. 5.

In a spinning reel for fishing, as shown in FIG. 1, a bearing 11 rotatably supports, in the forepart 1a of a reel body 1, the outer periphery of a cylindrical rotary shaft 10. A ratchet 13 and a collar 14 are fitted in front of the bearing 11 on the side of a spool 12. Finally the cylindrical portion 2a of a rotor 2 is fixed onto the shaft 10 with a locking nut 15.

The rotor 2 is supported so that the rotation of the rotor 2 is interlocked with that of a handle 16 via a driving gear (not shown) meshing with a pinion (not shown) provided on the rotary shaft 10.

The spool 12 is supported on the leading end portion of a spool shaft 17 fitted into the rotary shaft 10 and projecting therefrom, the reciprocation of the spool 12 being interlocked with the rotation of the handle 16.

As shown in FIGS. 1 to 6, the rotor 2 includes the cylindrical portion 2a, a front wall 2b, a large-diameter cylindrical portion 2c, and a pair of support arms 2f, 2g which projects forward from the outer periphery of the respective base portions 2d, 2e of the rotor 2.

The pair of bail support arms 2f, 2g are formed so that they are deflected or offset from the rotary shaft center of the rotor 2 by a distance or dimension D toward the fishline playing-out side of the bail.

One bail support member 3 having the fishline guide portion A is reversibly supported with a screw body 18 in the shaft portion 2h of the one support arm 2f. As shown in FIG. 2, the one bail support member 3 stays in the fishline winding position shown by a solid line when a fishline is wound up and is reversed toward the fishline playing-out position shown by a two-dot chain line when the fishline is played out.

The other bail support member 4, opposite from the one bail support member 3 having the fishline guide portion A, is reversibly supported with a screw body 19 in the shaft portion 2i of the other support arm 2g. As shown in FIG. 5, the other bail support member 4 stays in the fishline winding position shown by a solid line when the fishline is wound up and is reversed toward the fishline playing-out position shown by a two-dot chain line when the fishline is played out.

The pair of support arms 2f, 2g are formed in such a configuration that, as shown in FIGS. 2 and 5, they are respectively deflected or slanted from the leading end portions to which the bail support members 3, 4 are fitted toward the base portions 2d, 2e on the side of a bail arm 5 in the fishline winding position shown by the solid line.

Further, a recess 2j is formed in the inner periphery of the large-diameter cylindrical portion 2c and base portion 2e of the rotor 2 so that the rear portion of the inner periphery of the rotor 2 is formed into a thin-walled portion 2k at the area β opposite with respect to the rotary shaft 10 from the area α which is closer to the bail support arm 3 having the fishline guide portion A rather than the other bail support arm 4 and is located in the fishline winding side of the semi-annular bail arm 5. The portion of the rotor 2 within the area β is suitable for reducing the of wall-thickness relative to the opposite area across the rotary shaft 10.

The recess 2j is formed axially rearwardly from the mid-point of the rotor 2 to include the large-diameter cylindrical portion 2c and the base portion 2e up to the rear end thereof.

A through-hole 2m directed toward the center of the rotor 2 is bored in the base portion 2d, in the one support arm 2f.

Both ends of the semi-annular bail arm 5 are fitted to the respective bail support members 3, 4.

The fishline guide roller 20 of the fishline guide portion A is provided between the bail support member 3 and the bail arm 5.

Cover plates 21, 22 are fitted to the respective support arms 2f, 2g with machine screws 23, 24.

An L-shaped lever 6 for reversing the bail support members 3, 4 and the bail arm 5 from the fishline playing-out position shown by the two-dot chain line to the fishline winding position shown by the solid line is mounted in the recess 2n of the one support arm 2f as shown in FIG. 1 and 2.

A projection 6a at one end of the lever 6 is fitted into a hole (not shown) of the bail support member 3, whereas the other end 6b thereof is formed downward and fitted into through-hole 2m.

The other end 6b of the lever 6 faces a cam 1b provided on the reel body 1 of FIG. 1 in such a manner that the end 6b is contactable with the cam 1b.

When the rotor 2 is fitted to the rotary shaft 10, the pair of support arms 2f, 2g are installed such that they are offset from the center of the rotary shaft to the fishline playing-out side of the bail so that the axial line passing through the centers of the screw bodies 18, 19 of one and the other bail support members 3, 4 is offset by the distance D with respect to the center of the rotary shaft 10.

The operation of the spinning reel for fishing is such that when the hook and bait (not shown) are thrown out, the fishline (not shown) wound on the spool 12 is played out while the bail support members 3, 4 are in the fishline playing-out position shown by the two-dot chain line of FIGS. 2 and 5.

When the rotor 2 is rotated as the handle 16 is turned after the hook and bait are thrown out, the other end 6b of the lever 6 comes to contact the cam 1b provided on the reel body 1 and is moved back. Then the bail support member 3 is reversed and the bail support members 3, 4 together with the bail arm 5 are lifted up to the fishline winding position shown by the solid line of FIGS. 2 and 5.

At this time, the fishline is picked up by the bail arm 5 and thereafter guided to the fishline guide roller 20 of the fishline guide portion A.

When the rotor 2 is rotated as the handle 16 is turned, the fishline (not shown) is wound onto the spool 12.

As the rotor 2 rotates, the weight of the pair of bail support arms 2f, 2g becomes applied eccentrically in general since the weight of the semi-annular bail arm 5 and the fishline guide portion A is applied to the bail support arms 2f, 2g. However, the rotational balance of the rotor 2 can be ensured by mounting the pair of bail support arms offset from the center of the rotary shaft of the rotor 2 to the fishline playing-out side of the bail and by forming the rear portions of the inner periphery of the large-diameter cylindrical portion 2c and base portion 2e of the rotor 2 on the β side into the thin-walled portion 2k with the recess 2j as compared in configuration with the rear area α of the rotor without adding any balancer to the rear area α. The reduction in weight resulting from the thin-walled portion 2k formed on the β side corrects the imbalance in weight between the bail support members 3, 4 and the imbalance in weight between the bail arm 5 and the opposed bail arm side. Thus the rotational balance of the rotor 2 is stabilized.

With the rotor 2 whose rear portion is formed into the thin-walled portion 2k with the recess 2j in the spinning reel for fishing arranged as described above, the imbalance in weight is thus corrected, whereby the stabilized rotational balance of the rotor 2 makes it possible to perform a comfortable winding operation without providing a balancer separately from the rotor. Therefore, the rotational balance of the rotor is stabilized without increasing the total weight of the reel or the number of parts. As a result both fishing operability, and also assembling efficiency are improved.

Moreover, the rear end portion of the rotor without such an additional balancer can be configured without restrictions since no projections are needed.

Figure 7:
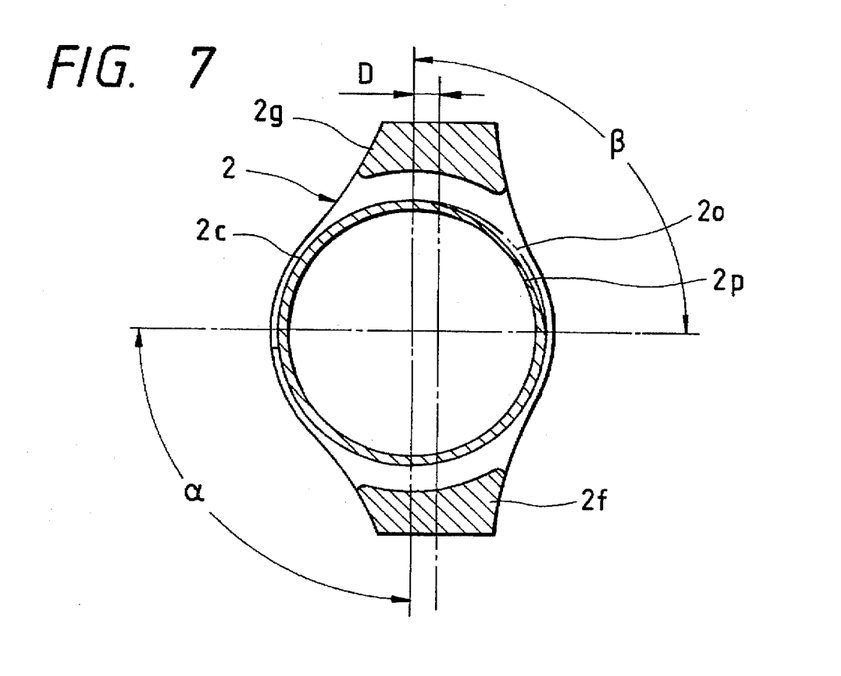
FIG. 7 is a sectional elevational view of a rotor as a second embodiment of the present invention.

FIG. 7 is a sectional elevational view of a rotor as a second embodiment of the present invention.

According to the second embodiment of the present invention, the outer peripheral diameter of the large-diameter cylindrical portion 2c of the rotor 2 is set greater and deflected so as to provide an indented portion 2o on the β side which is suitable for reduction of the wall thickness. The β side is opposite across the rotary shaft 10 from the rear area α of the rotor which is closer to the bail support arm 3 having the fishline guide portion A than to the opposite bail support arm 4 and which is within the fishline winding side of the semi-annular bail arm 5. Thus the rear configuration is formed into a thin-walled portion 2p with the effect of correcting any imbalance in weight.

The remaining arrangement is substantially similar to what has been described according to the first embodiment of the present invention.

Figure 8:
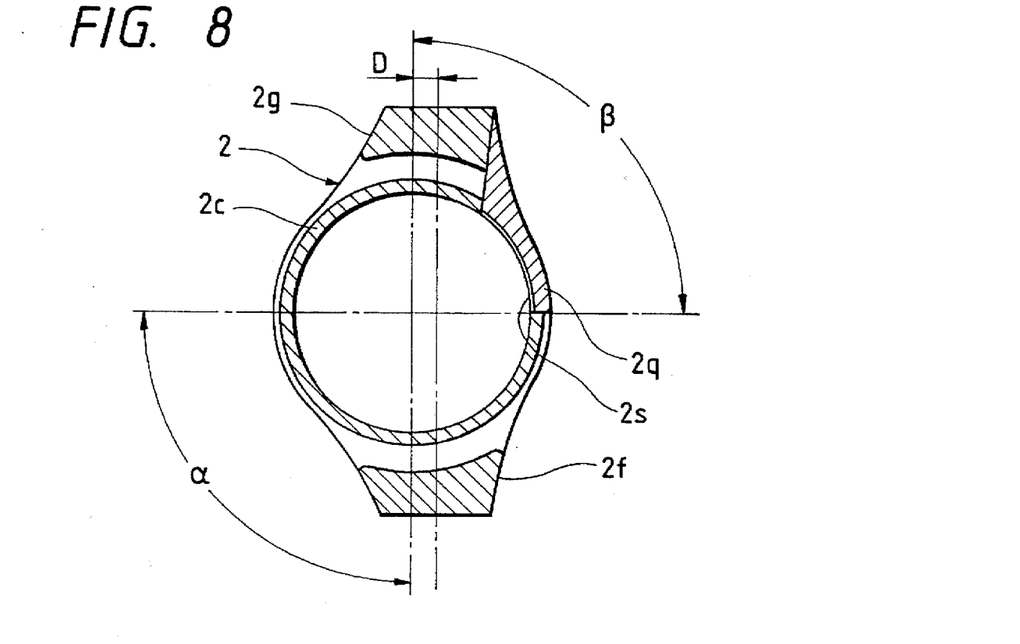
FIG. 8 is a sectional elevational view of a rotor as a third embodiment of the present invention.
Figure 9:
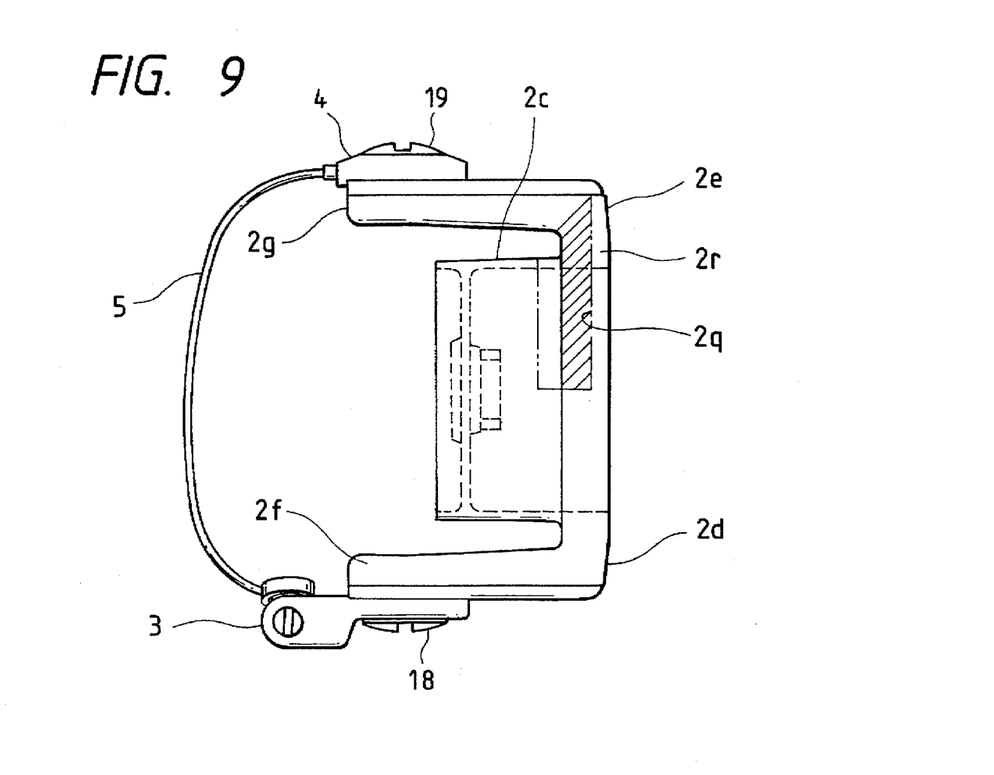
FIG. 9 is a side view of the rotor according to the present invention.

FIGS. 8 and 9 are, respectively a sectional elevational view and a side view of a rotor as a third embodiment of the present invention.

According to the third embodiment of the invention, the base 2e of the bail support arm 2g of the rotor 2 on the β side is partially indented to provide an indented portion 2q as shown by a hatch marks to form the rear portion of the rotor 2 axially into a thin-walled portion 2r and radially into a thin-walled portion 2s as compared in configuration with the rear area α of the rotor. As described before, the rear area α is on the bail side of the semi-annular bail arm 5 in the fishline winding setting and is closer to the bail support arm 3 having the fishline guide portion A than to the bail support arm 4 having no fishline guide. Thus the imbalance in weight is corrected.

As shown by the two-dot chain lines of FIGS. 8 and 9, a recess may be formed in the outer periphery of the large-diameter cylindrical portion 2c of the rotor 2.

The remaining arrangement is substantially similar to what has been described according to the first embodiment of the present invention.

As set forth above, according to the present invention thus arranged, the rotational balance of the rotor is stabilized and a comfortable winding operation is obtained as the rear portion of the rotor is formed into the thin-walled portion so as to correct the weight imbalance. Further, the rotational balance of the rotor is stabilized and the fishing operability is improved without increasing the weight of the reel overall or and the number of parts as required since the balancer as a separate body can be dispensed with.

It is thus possible to provide a spinning reel for fishing having an excellent effect of eliminating restrictions on configuration, since the rear end portion of the rotor without such a balancer is freed from the need for any projection.

What is claimed is:

1. A spinning reel for fishing comprising:
   a reel main body supporting a spool, onto which a fishline may be wound and from which the fishline may be played out;
   a rotor rotatable about a rotor axis and having a rotor rear portion;
   a pair of bail support arms formed on said rotor and projecting forwardly from the rear portion of said rotor; and
   first and second bail support members pivotably supported on forward end portions of said bail support arms and supporting a semi-annular bail therebetween so that the bail is reversible between a fishline winding position and a fishline playing-out position, said first bail support member having a fishline guide portion,
   wherein said rotor defines a first area α that is located closer to said first bail support member than to said second bail support member, and that is located within a side containing the bail in the fishline winding position with respect to the rotor axis, and further defines a second area β opposite from the first area α with respect to the rotor axis; and
   wherein a thickness of the rear portion of said rotor within the second area α is less than the thickness of the rear portion within the first area α.

2. A spinning reel according to claim 1, wherein the rotor has a recess located at an inner periphery of said rotor and within the second area α, the recess abutting the rear portion within the second area and corresponding in size to a difference in thickness between the rear portion in the first area α and the rear portion in the second area α.

3. A spinning reel according to claim 1, wherein the rear portion of said rotor within the second area α comprises an indented portion located at an outer periphery of said rotor and within the second area α.

4. A spinning reel according to claim 3, wherein said indented portion is at least partially located at a rear end of said bail support arm supporting said second bail support member.

5. A spinning reel according to claim 3, wherein said indented portion has an axial thickness that is less than the thickness of the rear portion within the first area α.

6. A spinning reel according to claim 3, wherein said indented portion has a radial thickness that is less than the thickness of the rear portion within the first area α.

7. A spinning reel according to claim 1, wherein each the said bail support arms is slanted with respect to the rotor axis.

8. A spinning reel according to claim 1, wherein a plane bisecting each of said bail support arms is offset laterally from the rotor axis into a side of said rotor containing the bail in the fishline playing-out position.

9. A spinning reel according to claim 1, wherein the bail support members are pivotable about a common pivot axis, the pivot axis being offset laterally from the rotor axis into a side of said rotor containing the bail in the fishline playing-out position.

10. A spinning reel for fishing comprising:

a reel main body supporting a spool, onto which a fishline may be wound and from which the fishline may be played out;

a rotor rotatable about a rotor axis and having a rotor rear portion;

a pair of bail support arms formed on said rotor and projecting forwardly from the rear portion of said rotor; and first and second bail support members pivotably supported on forward end portions of said bail support arms and supporting a semi-annular bail therebetween so that the bail is reversible between a fishline winding position and a fishline playing-out position, said first bail support member having a fishline guide portion;

wherein said rotor defines a first area $\alpha$ that is located closer to said first bail support member than to said second bail support member, and that is located within a side containing the bail in the fishline winding position with respect to the rotor axis, and further defines a second area $\beta$ opposite from the first area $\alpha$ with respect to the rotor axis;

said spinning reel further comprising:

means for stabilizing rotational balance of said rotor without use of additional, separate balancer weights, said means comprising a combination of both a slanted configuration of each said bail support arm with respect to the rotor axis and a shaping of the rear portion of said rotor within the second area $\alpha$ to have a thickness less than the thickness of the rear portion within the first area $\alpha$.

* * * * *